United States Patent
Choi et al.

(10) Patent No.: US 9,278,862 B2
(45) Date of Patent: Mar. 8, 2016

(54) METHOD FOR MANUFACTURING GRAPHENE AND GRAPHENE MANUFACTURED BY THE SAME

(71) Applicant: LG ELECTRONICS INC., Seoul (KR)

(72) Inventors: Minseok Choi, Seoul (KR); Taehyeong Kim, Seoul (KR); Jinsan Moon, Seoul (KR); Mynghee Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/201,274

(22) Filed: Mar. 7, 2014

(65) Prior Publication Data
US 2014/0370295 A1   Dec. 18, 2014

(30) Foreign Application Priority Data

Jun. 12, 2013   (KR) .................. 10-2013-0067198

(51) Int. Cl.
*C01B 31/04* (2006.01)

(52) U.S. Cl.
CPC ......... *C01B 31/0446* (2013.01); *C01B 31/0453* (2013.01); *Y10T 428/30* (2015.01)

(58) Field of Classification Search
None
See application file for complete search history.

(56) References Cited

U.S. PATENT DOCUMENTS

| | | | |
|---|---|---|---|
| 2009/0297854 A1* | 12/2009 | Lee et al. .................. | 428/408 |
| 2011/0014457 A1* | 1/2011 | Quitoriano ............... | B32B 9/00 |
| | | | 428/336 |
| 2012/0328906 A1 | 12/2012 | Kwon et al. | |
| 2014/0131761 A1 | 5/2014 | Kwon et al. | |
| 2014/0205763 A1* | 7/2014 | Lu et al. ................... | 427/530 |

FOREIGN PATENT DOCUMENTS

| | | | | |
|---|---|---|---|---|
| CN | 102791626 A | 11/2012 | | |
| CN | 103124691 A | 5/2013 | | |
| WO | WO 2012044284 A1 * | 4/2012 | ......... | C23C 16/0281 |
| WO | WO 2012148439 A1 * | 11/2012 | | |
| WO | WO 2013/015460 A1 | 1/2013 | | |
| WO | WO 2013/019021 A2 | 2/2013 | | |

OTHER PUBLICATIONS

Agilent Technologies; Material Expansion Coefficients; Jul. 2002.*

* cited by examiner

*Primary Examiner* — Michael P Rodriguez
(74) *Attorney, Agent, or Firm* — Birch, Stewart, Kolasch & Birch, LLP

(57) ABSTRACT

Disclosed is graphene. More particularly, disclosed are a method for manufacturing graphene to grow graphene with high quality and graphene manufactured by the same. The method includes preparing a thermal-expansion compensation substrate, forming a metal layer on the thermal-expansion compensation substrate, and forming graphene on the metal layer.

15 Claims, 2 Drawing Sheets

METHOD FOR MANUFACTURING GRAPHENE AND GRAPHENE MANUFACTURED BY THE SAME

Pursuant to 35 U.S.C. §119(a), this application claims the benefit of Korean Patent Application No. 10-2013-0067198, filed on Jun. 12, 2013, which is hereby incorporated by reference as if fully set forth herein.

BACKGROUND OF THE INVENTION

1. Field of the Invention

The present invention relates to graphene and more particularly, to a method for manufacturing graphene to grow graphene with high quality and graphene manufactured by the same.

2. Discussion of the Related Art

Substances containing carbon atoms include fullerene, carbon nanotube, graphene and graphite. Of these, graphene is a single atom layer whose structure is a two-dimensional planar array of carbon atoms.

In particular, graphene has considerably stable and superior electrical, mechanical and chemical properties as well as excellent conductivity and thus more rapidly carries electrons than silicone and enables application of higher electrical current than copper, which has been actively researched since it was demonstrated through experimentation based on discovery of a method of separating graphene from graphite in 2004.

Such graphene attracts much attention as a base material for electronic circuits because it may be produced over large areas and has electrical, mechanical, chemical stability as well as excellent conductivity.

In addition, electrical properties of graphene may change according to crystal direction of graphene with a predetermined thickness. For this reason, electrical properties are expressed in a direction selected by a user and devices can be thus easily designed. Accordingly, graphene is effectively used for carbon-based electronic or electromagnetic devices.

As such, graphene may be formed on a metal layer which is a catalyst substrate. In this regard, graphene has a negative thermal expansion coefficient, while a metal has a positive thermal expansion coefficient. Accordingly, the difference in thermal expansion coefficient may cause formation of wrinkles in graphene during manufacture of the graphene.

SUMMARY OF THE INVENTION

Accordingly, the present invention is directed to a method for manufacturing graphene to grow graphene with high quality and graphene manufactured by the same that substantially obviate one or more problems due to limitations and disadvantages of the related art.

An object of the present invention is to provide a method for manufacturing graphene and graphene manufactured by the same to compensate phenomena which may be generated by difference in thermal expansion between a metal layer and graphene formed on the metal layer and thereby grow graphene with high quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for manufacturing graphene includes preparing a thermal-expansion compensation substrate, forming a metal layer on the thermal-expansion compensation substrate, and forming graphene on the metal layer.

In accordance with another aspect of the present invention, a method for manufacturing graphene includes preparing a thermal-expansion compensation substrate containing a thermal expansion control substance, forming a metal layer on the thermal-expansion compensation substrate, and forming graphene on the metal layer, wherein the thermal expansion control substance has a lower thermal expansion coefficient than the metal layer or a negative thermal expansion coefficient.

In accordance with another aspect of the present invention, a method for manufacturing graphene includes preparing a thermal-expansion compensation substrate comprising a support substrate and a thermal expansion control substance disposed on the support substrate, wherein the thermal expansion control substance has a thermal expansion coefficient of −50 ppm/K to 5 ppm/K, forming a metal layer on the thermal-expansion compensation substrate, and forming graphene on the metal layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure. In the drawings.

DETAILED DESCRIPTION OF THE INVENTION

Reference will now be made in detail to the specific embodiments of the present invention, examples of which are illustrated in the accompanying drawings.

However, the present invention allows various modifications and variations and specific embodiments thereof are described in drawings and will be described in detail. The present invention should not be construed as limited to the embodiments set forth herein and includes modifications, variations, equivalents, and substitutions compliant with the spirit or scope of the present invention defined by the appended claims.

It will be understood that when an element such as a layer, area or substrate is referred to as being "on" another element, it can be directly on the element, or one or more intervening elements may also be present therebetween.

In addition, it will be understood that although terms such as "first" and "second" may be used herein to describe elements, components, areas, layers and/or regions, the elements, components, areas, layers and/or regions should not be limited by these terms.

Figure 1:
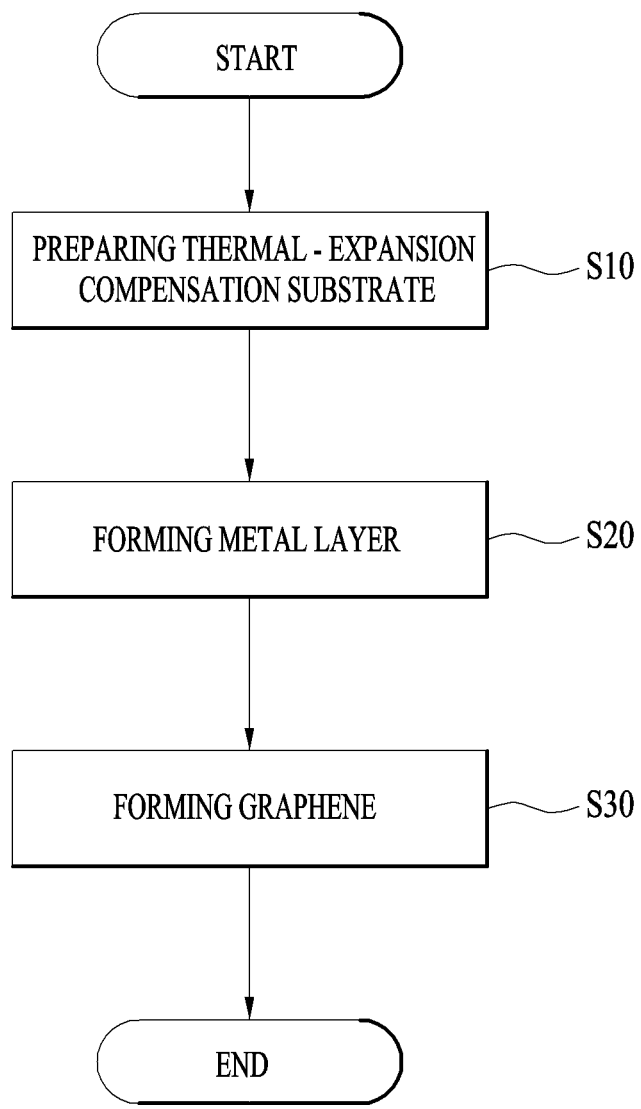
FIG. 1 is a flowchart illustrating an example of a method for manufacturing graphene.

FIG. 1 is a flowchart illustrating a method for manufacturing graphene. Hereinafter, the method for manufacturing graphene will be described in detail with reference to FIG. 1.

As shown in FIG. 1, first, a thermal-expansion compensation substrate is prepared (S10).

Figure 2:
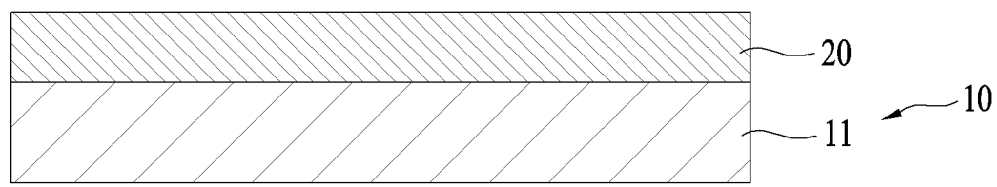
FIG. 2 is a sectional view illustrating an example of formation of a metal layer on a thermal-expansion compensation substrate.

Next, as shown in FIG. 2, a metal layer 20 is formed on the thermal-expansion compensation substrate 10 (S20).

The thermal-expansion compensation substrate 10 may contain a substance having a low thermal expansion coefficient or a negative thermal expansion coefficient.

For example, the thermal-expansion compensation substrate 10 may have a low thermal expansion coefficient or a negative thermal expansion coefficient of 5 ppm/K or less within a depth range from several nanometers (nm) to several tens of nanometers (nm) from the substrate.

In addition, the thermal-expansion compensation substrate 10 may be prepared using a substance which does not produce a compound through reaction with the metal layer 20 at a high temperature.

The thermal-expansion compensation substrate 10 may contain a thermal expansion control substance 11. For example, as shown in FIG. 2, the thermal-expansion compensation substrate 10 may be manufactured using the thermal expansion control substance 11.

Figure 3:
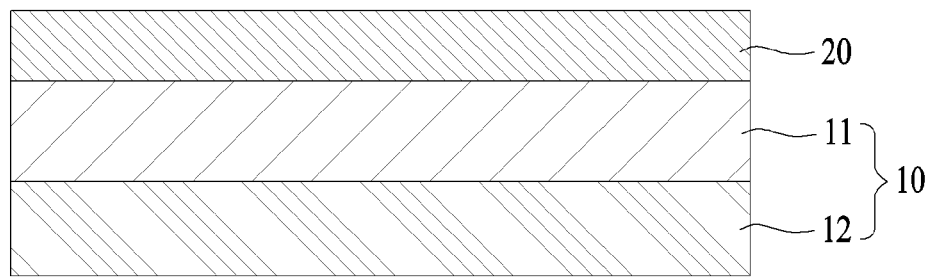
FIG. 3 is a sectional view illustrating another example of formation of a metal layer on a thermal-expansion compensation substrate.

In addition, the thermal-expansion compensation substrate 10 may be manufactured by forming the thermal expansion control substance 11 on a support substrate 12, as shown in FIG. 3.

Accordingly, the thermal expansion control substance 11 may directly contact the metal layer 20.

The support substrate 12 may contain at least one of silicon (Si), silicon oxide ($SiO_2$), sapphire and quartz, but the present invention is not limited thereto.

The thermal expansion control substance 11 may contain at least one of silicon carbide (SiC), graphite, graphene, carbon nanotube, diamond, $M_2B_3O_{12}$, $AX_2O_8$ and $A_2P_2WO_{12}$ wherein M represents Al, Sc, In, Y, Zr, Hf or a lanthanide metal, B represents W, Mo or P, X represents W or Mo, and A represents Zr or Hf.

The substance such as $M_2B_3O_{12}$, $AX_2O_8$ or $A_2P_2WO_{12}$ has a negative thermal expansion coefficient.

The thermal expansion coefficient of the thermal expansion control substance 11 may range from −50 ppm/K to 5 ppm/K.

In addition, when the metal layer 20 is formed on the thermal-expansion compensation substrate 10 containing the thermal expansion control substance 11, a combination layer including the thermal-expansion compensation substrate 10 and the metal layer 20 may have a thermal expansion coefficient of −20 ppm/K to 10 ppm/K.

The metal layer 20 may be formed of a catalyst metal enabling formation of graphene and the catalyst metal may include a metal such as Ni, Co, Fe, Pt, Au, Al, Cr, Cu, Mg, Mn, Mo, Rh, Si, Ta, Ti, W, U, V or Zr.

The catalyst metal generally has a positive thermal expansion coefficient. For example, a copper (Cu) has a thermal expansion coefficient of 16.4 ppm/K.

The metal layer 20 may have a thickness of about several angstroms (Å) to about several hundreds of nanometers and preferably have a small thickness of several angstroms (Å) to several tens of nanometers.

Figure 4:
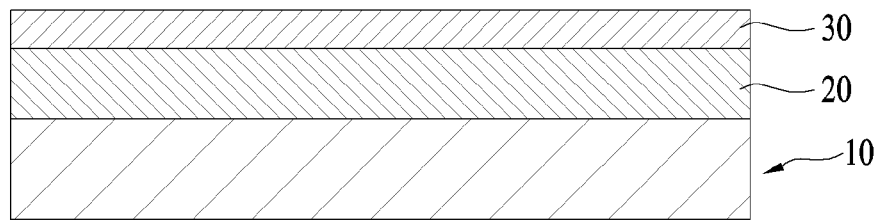
FIG. 4 is a sectional view illustrating an example of formation of graphene on the metal layer.

Next, as shown in FIG. 4, a graphene 30 is formed on the metal layer 20.

The formation of the graphene 30 may be carried out using chemical vapor deposition (CVD).

In addition, chemical vapor deposition such as thermal-chemical vapor deposition (CVD), inductive coupled plasma chemical vapor deposition (ICP-CVD), plasma-enhanced chemical vapor deposition (PE-CVD) and microwave CVD may be used. Furthermore, various methods such as rapid thermal annealing (RTA), atomic layer deposition (ALD) and physical vapor deposition (PVD) may be used.

Chemical vapor deposition is a method which grows the graphene 30 by loading the thermal-expansion compensation substrate 10 provided with the metal layer 20 in a chamber (not shown) and supplying a carbon source to the chamber under suitable growth conditions.

Examples of carbon source include gas-type carbon sources such as methane ($CH_4$) and acetylene ($C_2H_2$), solid-type carbon sources such as powders and polymers, and liquid-type carbon sources such as bubbling alcohol.

In addition, various carbon sources such as ethane, ethylene, ethanol, acetylene, propane, butane, butadiene, pentane, pentene, cyclopentadiene, hexane, cyclohexane, benzene and toluene may be used.

The formation of the graphene 30 may be carried out at a temperature of about 300 to about 1,500° C. The metal layer 20 and the graphene 30 may thermally expand or contract under this temperature condition.

After formation of the graphene 30 is complete, the graphene 30 formed on the thermal-expansion compensation substrate 10 is cooled to room temperature.

As described above, the metal layer 20 has a positive thermal expansion coefficient. For example, copper (Cu) has a thermal expansion coefficient of 16.4 ppm/K.

On the other hand, the graphene 30 formed on the metal layer 20 has a thermal expansion coefficient of −8 ppm/K. A length of the graphene 30 is reduced (contracted), as heat amount increases.

Accordingly, when the graphene 30 formed on the metal layer 20 at a temperature of 300 to 1,500° C. is cooled, a phenomenon caused by difference in thermal expansion in which the metal layer 20 contracts, but the graphene 30 expands may occur.

The thermal-expansion compensation substrate 10 compensates the phenomenon which may be generated by difference in thermal expansion between the metal layer 20 and the graphene 30.

That is, the thermal expansion control substance 11 having similar thermal expansion properties to the graphene 30 compensates the phenomenon which may be generated by difference in thermal expansion between the metal layer 20 and the graphene 30.

Many wrinkles may be produced in the graphene 30 formed without compensating the difference in thermal expansion between the metal layer 20 and the graphene 30.

The wrinkles may have negative effects on the graphene 30. That is, wrinkles produced during cooling of the formed graphene 30 may inhibit electrical properties of the graphene 30.

Accordingly, the metal layer 20 having a considerably small thickness of several angstroms (Å) to several tens of nanometers is disposed on the thermal-expansion compensation substrate 10 having a low or negative thermal expansion coefficient and the graphene 30 is formed on the metal layer 20, thus enabling control of thermal expansion and contraction of the metal layer 20 during heating and cooling of the metal layer 20.

A direction of the control is similar to a direction of thermal expansion of the graphene 30, thus preventing production of wrinkles in the graphene 30.

That is, the metal layer 20 does not greatly contract during cooling of the formed graphene 30, thus enabling production of the graphene 30 which is considerably flat and has low roughness and high performance.

As such, by compensating the difference in thermal expansion between the graphene 30 and the metal layer 20, qualities of the graphene 30 can be greatly improved and in particular, electrical properties of the graphene 30 can be greatly improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing graphene comprising:
preparing a thermal-expansion compensation substrate;
forming a metal layer on the thermal-expansion compensation substrate; and
forming graphene on the metal layer,
wherein the thermal-expansion compensation substrate comprises a thermal expansion control substance, and
wherein the thermal expansion control substance comprises at least one of silicon carbide (SiC), $M_2B_3O_{12}$, $AX_2O_8$ and $A_2P_2WO_{12}$, wherein M represents Al, Sc, In, Y, Zr, Hf or a lanthanide metal, B represents W, Mo or P, X represents W or Mo, and A represents Zr or Hf.

2. The method according to claim 1, wherein the thermal expansion control substance has a thermal expansion coefficient of −50 ppm/K to 5 ppm/K.

3. The method according to claim 1, wherein preparing of the thermal-expansion compensation substrate comprises forming a thermal expansion control substance on a support substrate.

4. The method according to claim 3, wherein the support substrate comprises at least one of silicon (Si), silicon oxide ($SiO_2$), sapphire and quartz.

5. The method according to claim 1, wherein a combination layer of the thermal-expansion compensation substrate and the metal layer has a thermal expansion coefficient of −20 ppm/K to 10 ppm/K.

6. The method according to claim 1, wherein the thermal-expansion compensation substrate compensates a difference in thermal expansion between the metal layer and the graphene.

7. A method for manufacturing graphene comprising:
preparing a thermal-expansion compensation substrate comprising a thermal expansion control substance on a support substrate;
forming a metal layer on the thermal-expansion compensation substrate; and
forming graphene on the metal layer,
wherein the thermal expansion control substance has a lower thermal expansion coefficient than the metal layer or a negative thermal expansion coefficient, and
wherein a combination layer of the thermal-expansion compensation substrate and the metal layer has a thermal expansion coefficient of −20 ppm/K to 10 ppm/K.

8. The method according to claim 7, wherein the thermal expansion control substance comprises at least one of silicon carbide (SiC), graphite, graphene, carbon nanotube, diamond, $M_2B_3O_{12.5}$ $AX_2O_8$ and $A_2P_2WO_{12}$,
wherein M represents Al, Sc, In, Y, Zr, Hf or a lanthanide metal, B represents W, Mo or P, X represents W or Mo, and A represents Zr or Hf.

9. The method according to claim 7, wherein the thermal expansion control substance has a thermal expansion coefficient of −50 ppm/K to 5 ppm/K.

10. The method according to claim 7, wherein the support substrate comprises at least one of silicon (Si), silicon oxide ($SiO_2$), sapphire and quartz.

11. The method according to claim 7, wherein the thermal expansion control substance directly contacts the metal layer.

12. A method for manufacturing graphene comprising:
preparing a thermal-expansion compensation substrate comprising a support substrate and a thermal expansion control substance disposed on the support substrate, wherein the thermal expansion control substance has a thermal expansion coefficient of −50 ppm/K to 5 ppm/K;
forming a metal layer on the thermal-expansion compensation substrate; and
forming graphene on the metal layer,
wherein a combination layer of the thermal-expansion compensation substrate and the metal layer has a thermal expansion coefficient of −20 ppm/K to 10 ppm/K.

13. The method according to claim 12, wherein the thermal expansion control substance comprises at least one of silicon carbide (SiC), graphite, graphene, carbon nanotube, diamond, $M_2B_3O_{12}$, $AX_2O_8$ and $A_2P_2WO_{12}$,
wherein M represents Al, Sc, In, Y, Zr, Hf or a lanthanide metal, B represents W, Mo or P, X represents W or Mo, and A represents Zr or Hf.

14. The method according to claim 12, wherein the support substrate comprises at least one of silicon (Si), silicon oxide ($SiO_2$), sapphire and quartz.

15. The method according to claim 12, wherein the thermal-expansion compensation substrate is configured to compensate a phenomenon generated by difference in thermal expansion between the metal layer and the graphene.

* * * * *